Nov. 3, 1931.　　　　　J. LEDWINKA　　　　　1,829,751
PRESSED METAL AUTOMOBILE BODY
Filed Jan. 9, 1926　　　6 Sheets-Sheet 4

INVENTOR.
JOSEPH LEDWINKA
BY
John P. Tarbox
ATTORNEY.

Nov. 3, 1931.  J. LEDWINKA  1,829,751
PRESSED METAL AUTOMOBILE BODY
Filed Jan. 9, 1926   6 Sheets-Sheet 5

INVENTOR.
JOSEPH LEDWINKA
BY
ATTORNEY.

Nov. 3, 1931.  J. LEDWINKA  1,829,751

PRESSED METAL AUTOMOBILE BODY

Filed Jan. 9, 1926  6 Sheets-Sheet 6

INVENTOR.
JOSEPH LEDWINKA
BY John P. Tarbox
ATTORNEY.

Patented Nov. 3, 1931

1,829,751

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

PRESSED METAL AUTOMOBILE BODY

Application filed January 9, 1926. Serial No. 80,166.

This invention relates to automobile bodies of closed design, known as the sedan type, and relates particularly to structures of this type which are built up of sheet steel stamped or otherwise formed into the desired form or contour and rigidly secured together.

The object of the invention is to provide a closed automobile body which is at once simple, strong and rugged and which can be easily and economically manufactured.

A further object of the invention is to provide a closed automobile body construction in which the component stampings used in the completed body are joined together to form several major units, which units, as such, are combined and assembled to form the completed body, whereby the cost of manufacturing is reduced and the speed of production increased.

A still further object of the invention is to provide an improved construction in the cowl unit assembly with especial regard to the toe board support and the front door post reinforcements.

A still further object is the provision of a side header of such cross section as permits the application of the roof unit with greater ease and facility than has heretofore been possible.

A still further object is the provision of means adapted to join the sides of the bottom rail of the cowl unit with the bodies of the front door posts in a manner which is simple as it effects a neat and secure joint at the juncture of the upper portions of the cowl and the door posts.

A still further object is to provide a body construction wherein the same may be conveniently and economically shipped from the place of manufacture to that of final assembly.

A still further object is the provision of an improved manner of securing the base of the rear body post to the body under-framework.

Other objects of the invention will appear more fully hereinafter.

The invention consists substantially in the construction, combination, location and relative arrangement of parts all as will be more fully hereinafter set forth as shown in the accompanying drawings and finally pointed out in the appended claims.

Referring to the accompanying drawings—

The same part is designated by the same reference numeral wherever it ocurs throughout the several views.

In the manufacture of automobile bodies it is desirable to secure strength and rigidity in the completed structure, simplicity in the parts composing the structure and speed in the assembling and joining of the parts together in order to secure economy. In attaining this result it is equally desirable to secure ruggedness in the completed structure and the production of a body to efficiently withstand the shocks and vibrations in use.

In the accomplishment of these objects and purposes I propose to construct the automobile body out of sheet steel stampings which are pressed or stamped into the desired shape or contour and are assembled and secured together to produce a single integral homogeneous structure.

Figure 1:
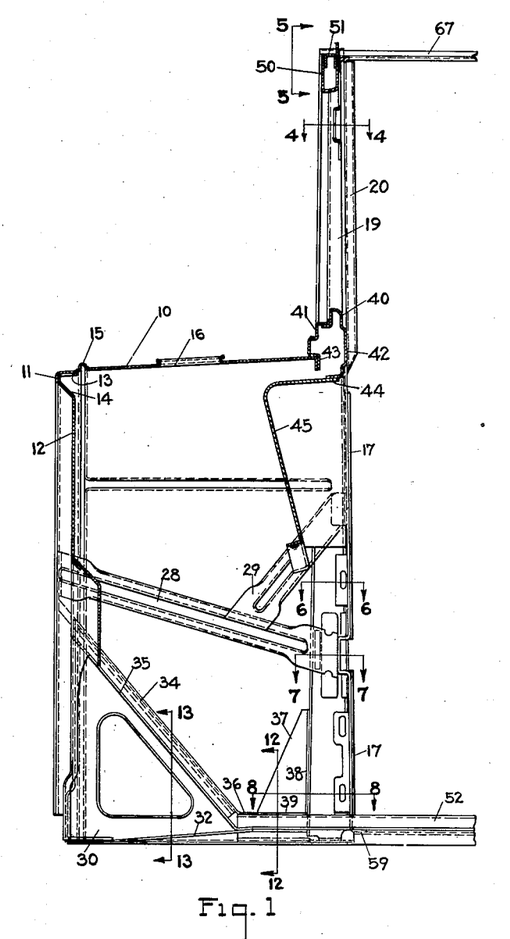
Figure 1 is a central longitudinal section of the cowl unit.
Figure 2:
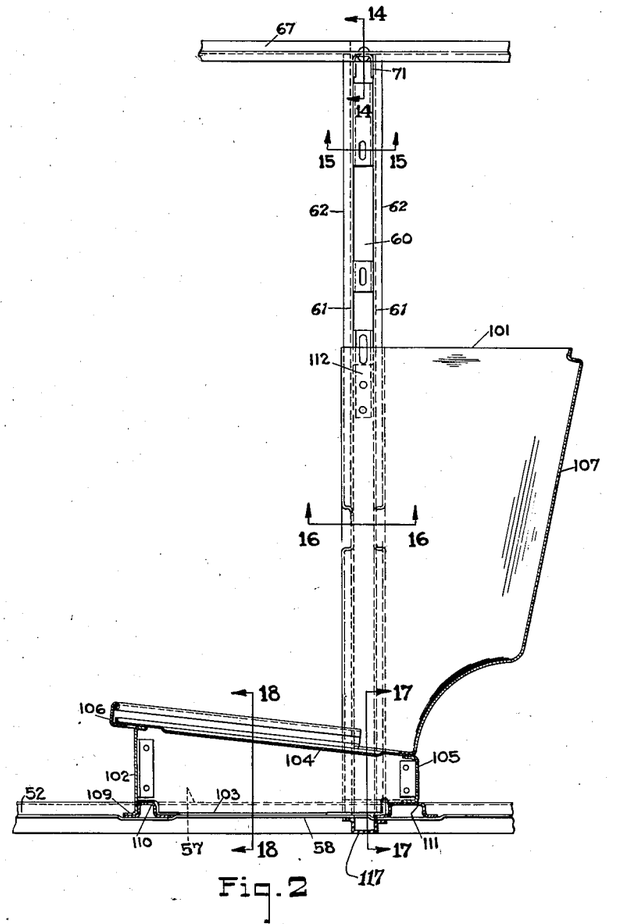
Fig. 2 is a section through the central portion of the body showing the sill and header connected by the B and C post and the manner of securing the front seat in position.
Figure 3:
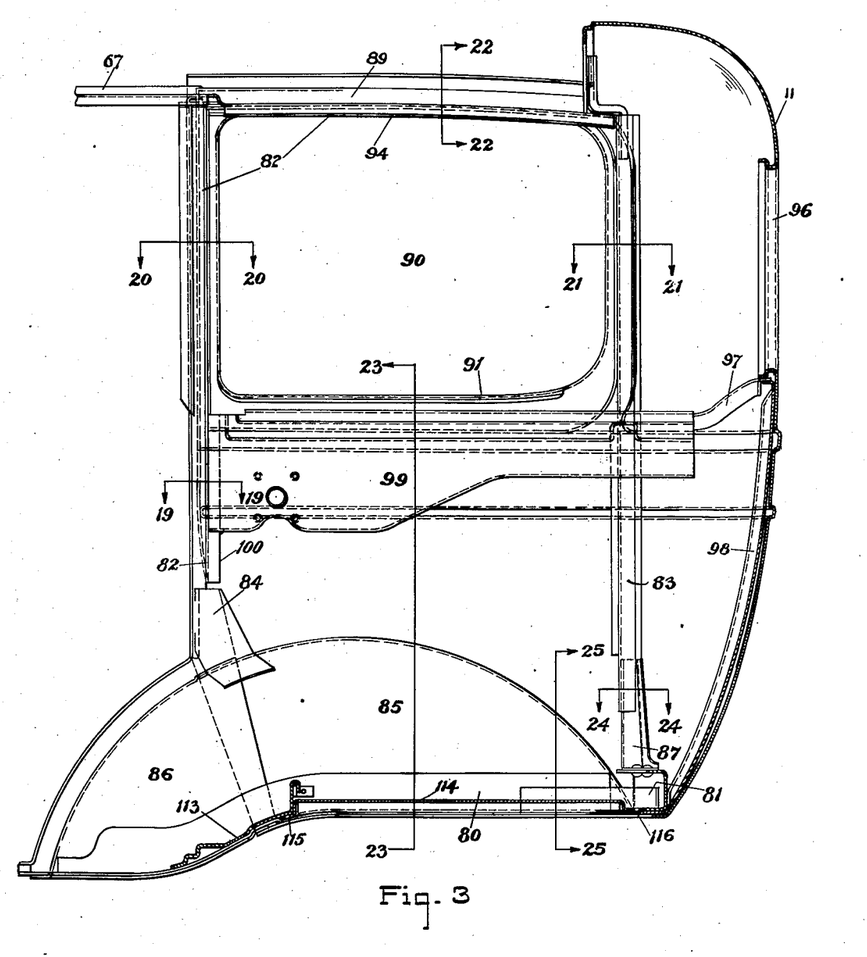
Fig. 3 is a central longitudinal section of the tonneau unit.

Referring to the drawings and more particularly to Figs. 1, 2 and 3 it will be seen that the body is comprised essentially of several major units, namely, the cowl unit, a pair of side units to which is adapted to be independently assembled a front seat unit, and a tonneau unit. These major units are each separately and independently fabricated to form complete units which units are in turn combined and joined together integrally to form the completed automobile body. In order that this method of building a body by the use of independently assembled units may best be effected recourse is had to various joints between the several units, these joints being designated for the purpose of this specification "unit construction joints". These unit construction joints are located approximately in the vicinity of the bases and tops of the front door or A posts and at the bases and tops of the rear door or D posts.

The cowl unit assembly or structure comprises in the main the cowl panel 10 which may be formed in one section as shown or in several sections. This panel is formed to slope downwardly to meet the motor hood of the chassis (not shown) at its forward edge. Its forward edge is flanged as shown at 11 and within the flanged portion and connected with the cowl by welding to the flange is reinforcement and cross bracing member preferably in the form of a shroud pan 12. This shroud pan 12 is provided at its upper edge with a rearwardly turned flange 13 which forms together with a downwardly and rearwardly turned portion 14 a channel adding greatly to the stiffness and rigidity afforded the forward edge of the cowl panel by the shroud pan 12. Immediately to the rear of the forward edge of the cowl panel is provided a transversely extending bead 15 while in the central top portion of the panel a ventilating opening 16 is provided.

Figures 4, 6, 7, 8, 12:
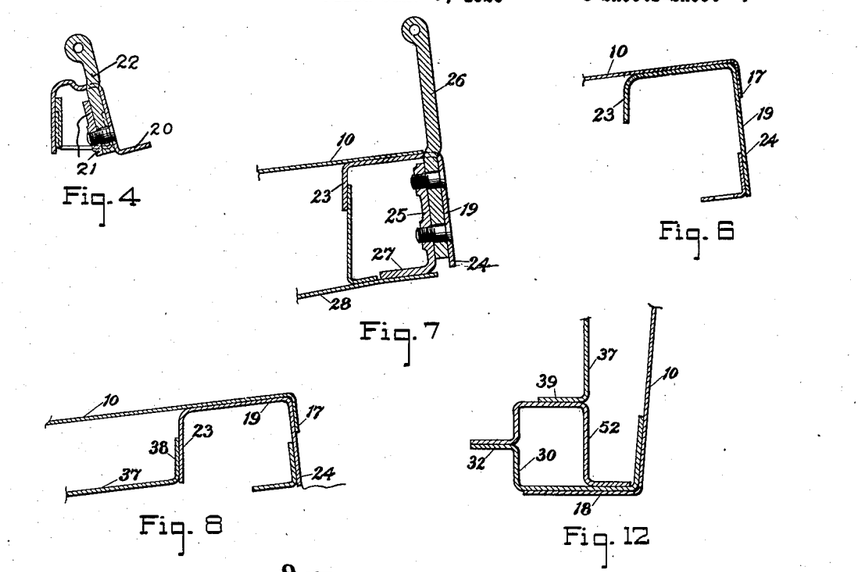
Figs. 4 to 8 inclusive are sections taken on corresponding lines of Fig. 1 showing the structure of the elements appearing therein.
Figs. 12 and 13 are sections taken on the corresponding lines of Fig. 1.

The cowl panel is provided at its rear edges with inwardly extending flanges 17 (see Figs. 6 and 8) and at its bottom edges with inwardly extending flanges 18 (see Fig. 12). Embraced by the sides and inwardly extending flanges 17 of the cowl panel 10 are the front door or A posts 19. These posts are secured through the medium of unit construction joints, directly to the forward portions of the body side sills as will be described more fully hereinafter, and extend from the sills upwardly for joinder with the longitudinally extending side top rails, at the tops of which the upper forward unit construction joints are effected. These posts are of varying section throughout their length as is evident from comparing the sections in Figs. 4, 6, 7 and 8. The posts, however, are uniform throughout their length in that they are of inwardly presenting channel formation. The top section of the A post, (as is clearly shown in Fig. 4), is of channel formation the inner wall of which is provided with a rearwardly extending flange 20 forming a shoulder to accommodate the hinge rail of the front door. Attached to the interior of the rear wall of the upper section of the door post by means of a hinge bracket 21 is the upper hinge element 22.

The portion of the A post below the windshield opening or bottom rail of the cowl unit is also of substantially inwardly presenting channel formation having front and rear walls 23—24. Secured to the rear wall 24 by means of a hinge bracket 25 is the lower hinge element 26. This hinge bracket 25 differs somewhat from the upper hinge bracket in that it is provided with a forwardly extending portion 27 to which is secured, preferably by welding, the rear end of a reinforcing brace 28, the forward end of which is integrally joined to the shroud pan 12. Interconnecting the body portion of this brace 28 and the A post 19 is an additional upwardly and rearwardly extending reinforcing brace 29. It will thus be seen that there is effected a very secure and rigid inter-bracing between the post, shroud pan and cowl panel by means of the interconnecting reinforcing braces 28 and 29.

Figure 13:
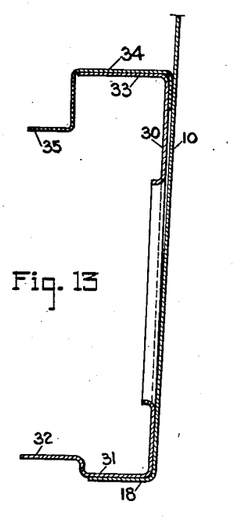

Secured to the lower forward portions of the cowl side panel 10 is a triangularly shaped toe board support reinforcing plate 30, best shown in Fig. 13. This reinforcing plate is provided with an inturned lower flange 31 having a portion thereof upwardly offset as at 32. The plate is rearwardly extended and provides an upwardly presenting channel formation in its rearward extension, see Fig. 12, through which it is secured to the forward end of the main side sill in the manner hereinafter described. Along its upper inclined edge the plate 30 is provided with an inwardly extending flange 33 to which is secured the toe board support 34 having the inwardly extending flange 35 upon which the toe board is adapted to rest. As clearly appears in Figs. 1 and 13 the central portion of the reinforcing plate may be cut out for the sake of lightness. The bottom flange 32 extends rearwardly into abutting relationship with the forward side of the A post. The lower end of the toe board support 34 is provided with a rearward extension 36 adapted to overlie the top of the body side sill 52. Still another effective reinforcing member is a triangularly shaped gusset member 37 provided with flanges 38 and 39 secured respectively to the forward wall of the A post 19 and to the top of the body side sill 52. The flange 39 extends forwardly into abutting relationship with the rear edge of the portion 36, both the portion 36 and the flange 39 lying in substantially the same horizontal plane whereby to form a neat appearing and at the same time a strong and effective joint.

Figure 11:
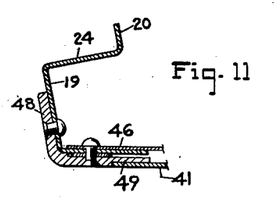
Fig. 11 is a section taken on the line 11—11 of Fig. 10.

Interconnecting the A post at the bottom of the windshield opening is a bottom rail 40 comprising two stampings 41 and 42 integrally joined together, the stamping 41 being provided with a rabbetted portion 43 forming a shoulder adapted to rest upon the rear top portion of the cowl panel and the stamping 42 being provided with a forwardly extending flange 44 by which is supported an instrument board 45. A bracket 46 having an upwardly extending portion 47 seating in the body of the A post serves to securely and rigidly interconnect the sides of the bottom rail and the A posts. However, in order to effect an even stronger union at these points provision is made of solid cast members 48 substantially of angle form as is more particularly shown in Fig. 11. These members 48 are each provided with tabs 49 extending behind and secured to the bottom rail stamping while the rearwardly extending arm of the casting embraces the base of the channeled door post and is secured there'o whereby a very neat corner joint is effected.

The free upper ends of the A post 19 are interconnected by the transversely extending header member or peak panel 50 of substantially upwardly presenting channel formation, the rear wall of the channel being of somewhat greater depth than the front wall and the base of the channel being inclined rearwardly and upwardly to more properly accommodate a windshield. Spacing elements or struts 51 are secured in the channel at intervals whereby in effect a box girder formation is obtained. The specific manner of inter-bracing the A posts and the peak panel by means of specially designed bracket members will be described more fully hereinafter in connection with the side top rails and their joinder to the front door posts.

Figures 14, 15, 17, 18:
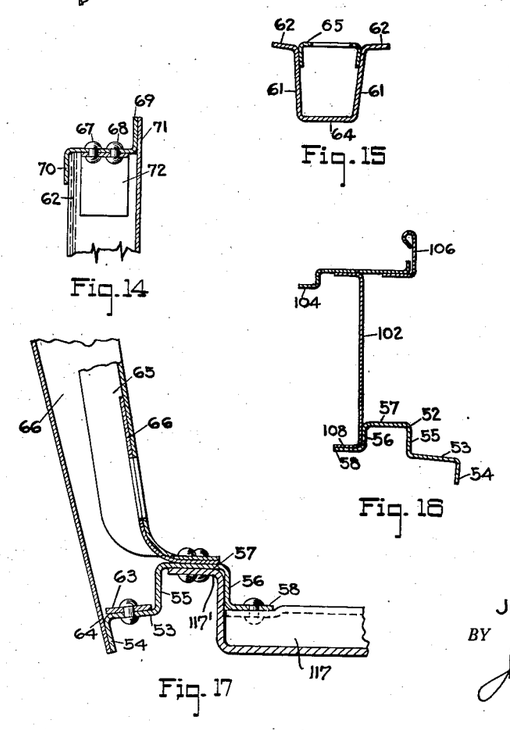
Figs. 14 to 18 inclusive are sections taken on the corresponding lines of Fig. 2.

In Fig. 2 is shown one side of the body including a bottom side sill, a side top rail and a B and C post which latter is that post against which both the front and rear doors close. In Fig. 18 the double or compound Z section of the sill 52 is clearly shown. The outer Z of this section is composed of a body web 53 and outer and inner arms 54 and 55, respectively. The outer arm 54 points downwardly and inwardly while the inner arm extends upwardly and forms with the web 53 of the Z an angle section presenting outwardly and upwardly of the body. The inner Z of the section is composed of the web 56 and upper arm 57 and lower arm 58. The upper arm 57 joins the arm 55 of the outer Z section and with it forms an angle section presenting inwardly and downwardly of the body. The upper arm 55 of the outer Z section and upper arm 57 of the inner Z section and the body web of the inner Z section together constitute a transverse section of inverted channel shape. The web 56 of the inner Z is of less height than the arm 55 of the outer Z giving the channel 56—57—55 channel walls of different height. The inner arm of the inner Z extends laterally and interiorly of the body and is in the form of a lateral flange on the inner channel wall 56. The web 53 of the outer Z may be regarded as a laterally and outwardly extending flange on the outer channel wall.

This side sill is of considerable length. The forward end of the sill extends into the cowl unit forwardly of the base of the A door post until its forward edge rests directly beneath the rearwardly extending portion 36 of the toe board support 34. This portion 36 then rests and is directly connected to the top of the base 57 of the inverted channel sill. The flange 39 of the bracket member 37 is also secured to the base 57 of the sill. The rear wall 24 of the door post 19 has its bottom up-turned to form a rearwardly extending lip flange or tab 59 which rests upon and is integrally secured, as by welding, to the web 53 of the body sill. Erected in the angle formed by the portions 55 and 53 of the body sill is the B and C post member 60. This post, like the A post, is of channel section extending inwardly. The side walls 61 are provided with lateral flanges 62. These flanges 62 are in turn provided with inwardly extending flanges 63, throughout the lower extent of the post, these latter flanges extending with the bottom wall 64 of the B and C post downwardly to the body side sill where the flanges 63 are spread apart to permit their securement to the portion 53 of the body sill. The base wall 64 of the B and C post continues downwardly and is secured by welding to the outer face of the downwardly extending portion 54 of the sill as is clearly shown in Fig. 17. The B and C door post is provided with spaced upholstery securing clips 65 of channel shape having opposite walls secured as by spot welding, to the walls of the door post. To give additional strength to the lower one of these upholstery fastening members a member 66 is employed, both the members 65 and 66 being provided with inwardly extending flanges overlying the portion 57 of the body sill whereby a secure connection between the bottom of the B and C post and the body sill is obtained.

Mounted upon and secured to the top of the B and C post 60 is a top rail 67. This top rail 67 which extends from the front post to the rear post of the body, namely, from the A post to the E post, is of simple Z section throughout that portion extending forwardly of the D post and of double angle cross section throughout that portion which extends rearwardly of the D post as is clearly shown in Figs. 14 and 22. Throughout substantially its entire length, this top rail is provided with a horizontally disposed web portion 68 having upwardly and downwardly projecting arms 69 and 70. It is at the top of the E posts that the upper rear unit construction joints are effected with the rear ends of the top rails 67.

In Fig. 14 is shown the method of securing the top of the B and C post to the top rail 67. It will be seen that the bottom wall 64 of the channelled door post is provided with an extension 71 lying flush against the wall 69 of the top rail while the laterally extending flanges 62 of the door post abut the web 68 of the top rail and lie flush against the depending flange 70 thereof. This top rail 67 is supported primarily at the top of the B and C post as has just been stated but connection is also made with the A post and D post through butt joints with the tops thereof, gas welded in the meeting corners and along the meeting lines. Suitable reinforcements are provided in each case. In the case of the B and C post a U-shaped clip 72 is socketed and welded and riveted between the web 68 of the top rail and the side walls of the door post channel as indicated most clearly in Figs. 2 and 14. By welding and riveting these elements together a very secure joint between the top of the door post and the top rail is obtained.

Figure 5:
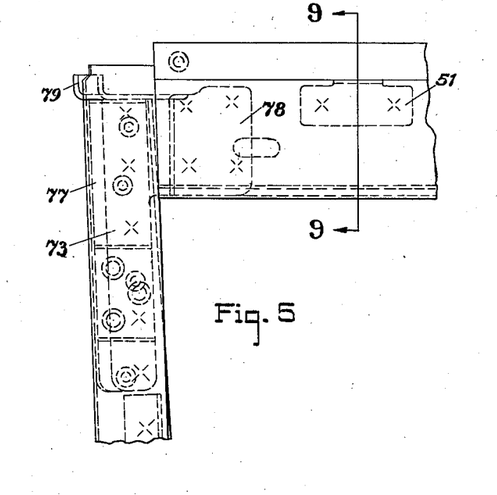
Figure 9:
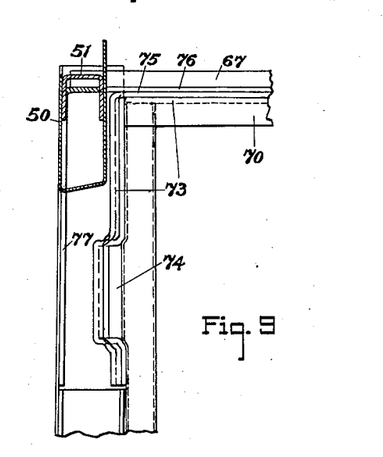
Fig. 9 is a view taken on the lines 9—9 of Fig. 5.
Figure 10:
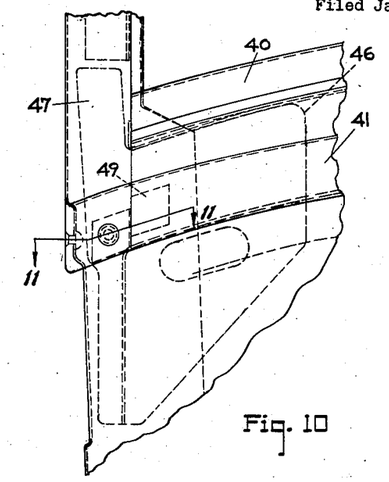
Fig. 10 is a perspective view of a portion of the front door post and the bottom windshield rail joined thereto.

The top rail 67 abuts the rear side wall of the A post 19 and the reinforcement of the joint is by means of an angle 73 which angle also constitutes in its downwardly extending branch an anchor for the upper hinge 74 of the front door, this being most clearly shown in Fig. 9. This reinforcing angle 73 is supplemented by an additional bracket 75 of such form that it securely interconnects and interbraces the forward portion of the top rail with the top of the A post and the side of the peak panel. In order to accomplish this triple joinder the bracket 75 is provided with a rearwardly extending branch 76, a downwardly extending branch 77 and a laterally extending branch 78. The rearwardly extending branch 76 rests upon and is secured to the rearwardly extending portion of the bracket 73 which is in turn secured to the top rail 67. The depending portion 77 of this three-way bracket lies flush against the forward wall of the A post for welding thereto while the lateral extension 78 of the bracket, which is somewhat offset from the portion 77 thereof, lies flush against the inside face of the forward wall of the channel member 50. A still further reinforcement is obtained by the provision of an upwardly extending flange 79 formed along the outer edge of the portion 76 of the three-way bracket and adapted to lie flush against the upwardly extending arm 69 of the top rail for welding thereto. This is most clearly shown in Figs. 5 and 9.

Figure 20:
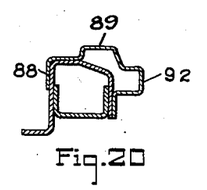
Figure 21:
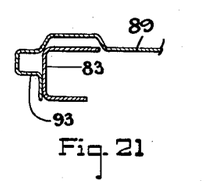
Figures 22, 23, 24, 25, 26, 27:
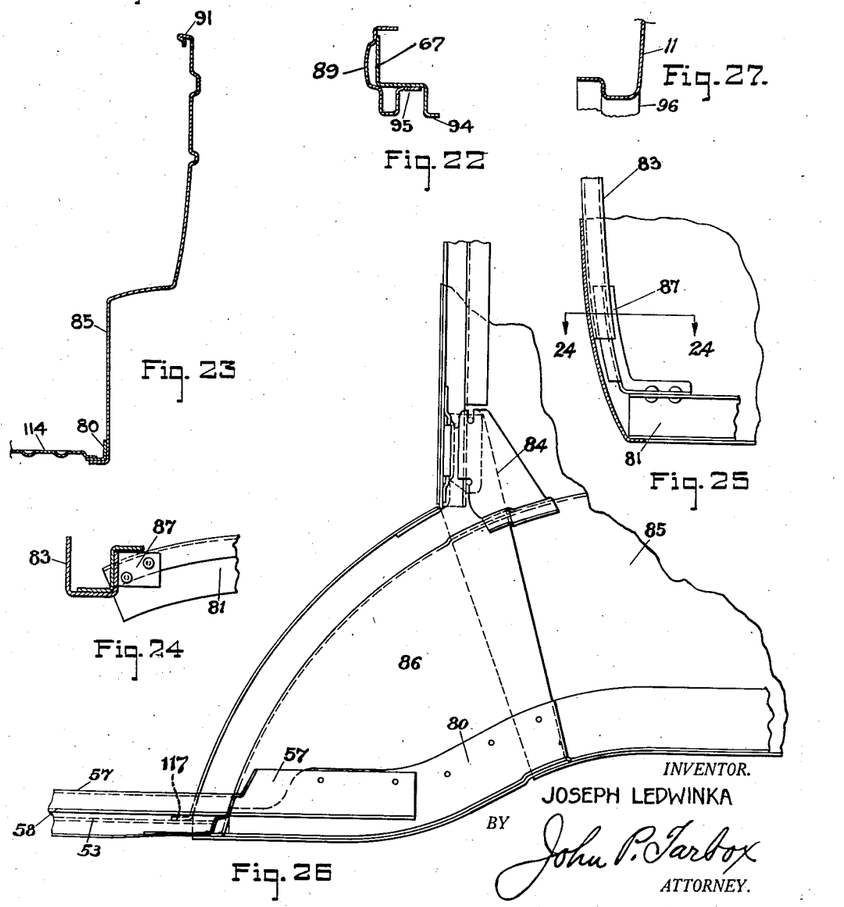
Fig. 26 is an enlarged view showing in detail the construction in the vicinity of the D bracket.
Fig. 27 is a detail longitudinal sectional view through the upper edge of the rear window opening.

The tonneau unit which is shown as a whole in Fig. 3 is comprised of the tonneau side and rear paneling integrally joined together to constitute in effect a single tonneau panel. Sills 80 of angle formation and a rear sill 81 of channel formation joined together by suitable reinforcements form the lower supporting structure for the tonneau unit. This lower supporting framework of the tonneau unit is supplemented by the posts D and E indicated in the drawings by 82 and 83. (See Figs. 20 and 21). As is the case of the B and C post the structure of the D post is also of channel section presenting inwardly and as in the case of the A post it is provided with hinge mountings of similar description. The brace 84 for the lower rear door hinge structure extends from the front channel wall rearwardly and is anchored by welding partly to the wheel housing 85 of the tonneau structure and partly to the post D bracket 86 as is clearly indicated in Figs. 3 and 26. This D post, instead of being erected and welded directly upon the side sill, is erected upon the post D bracket 86. The tonneau side sill 80 which is connected to the body side sill (by the post D bracket 86) is of angle cross section as appears clearly in Fig. 23 and presents inwardly, the lower branch being an inturned flange. The connection of this tonneau sill with the body side sill 36 is fully set forth in the copending application, Serial No. 740,425, filed September 29, 1924 and entitled body side sill construction. This construction need not be described in detail here except so far as it enters into the combinations comprehended by the invention disclosed herein. The tonneau paneling is provided along its lower edge with an inturned flange which is in turn secured by welding to the tonneau sills 80 and 81. The forward lower corner of the tonneau paneling is cut on a bias as is shown in Figs. 3 and 26 for joinder with the post D bracket.

The E post 83, which is that post directly to the rear of the side window opening in the tonneau unit, is also of channel formation but has its opening presenting rearwardly. This post extends substantially from the top line of the window opening downwardly to a point just above the rear sill 81. Instead of connecting the lower end of this E post to the wheel housing, as is usually done, in this case an interconnecting bracket member 87 of substantially simple Z cross section throughout its major portion is fitted within the channel of the E post and welded thereto in such manner that the web of this bracket 87 extends downwardly and laterally to overlie the top of the rear sill 81 to which it is rigidly secured as by welding or riveting. This is clearly shown in Figs. 24 and 25.

Figure 19:
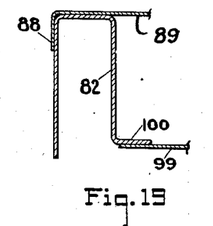
Figs. 19 to 25 inclusive are sections taken on the corresponding lines of Fig. 3.

The tonneau side and back structure is comprised of the tonneau paneling of the car and is formed in one piece as usual secured to the tonneau side sills 80 and to the tonneau rear sills 81 by the provision of inturned flanges welded directly to the bottoms of these sills. The forward vertical edges of the tonneau panel are provided with inturned flanges 88 which embrace the forward walls of the D post as clearly appears in Figs. 19 and 20. Between the D and E posts the paneling of the tonneau side section immediately adjacent its upper side edge 89 which is formed as part of the tonneau side panel stamping is cut away to form a window opening 90. Its walls are flanged inwardly over that part of the window framing constituted by the D and E posts and to form the transverse outer window sill rail 91 shown in Fig. 23. Those portions which are flanged inwardly over the D and E posts are rabbetted as at 92 and 93 to accommodate the window guide channels. The framing at the top of the window opening is formed principally by that portion of the top rail 67 which extends rearwardly of the D post. This rear extension of the top rail 67 is in addition provided with an inwardly extending flange 94, the tonneau paneling 89 being beaded and flanged over the top rail as is clearly shown in Fig. 22 to form the upper channel 95 for accommodation of the upper edge of the window pane.

The back wall of the tonneau paneling extends upwardly and forwardly to a point just beyond the rear vertical line of the side windows, the forward edge thereof being provided with a transversely extending rabbet for supporting the roof unit. A rear window opening 96 is provided in the back of the tonneau panel in the usual manner. Extending from post D on one side of the body to post D on the other and constituting the reinforcing member for the lower flange of the rear window 96 is a reinforcing angle 97. Throughout the major portion of its length this angle member 97 is spaced from the body of the car thus serving not only as a brace for tying together the side and rear of the tonneau but also as a means for attaching upholstery in place. Disposed centrally of the back panel of the tonneau is a vertically extending spare tire carrier 98 having its upper end secured to the angle member 97 preferably by welding and its lower end secured to the bottom of the rear sill 81. The tonneau unit is completed by the addition of a window regulator panel 99 extending between and secured to posts D and E. Immediately below the window opening 90 for purposes of attaching this window regulator panel 99 post D is provided with a rearwardly extending flange 100 shown more clearly in Fig. 19.

Extending between the opposite B and C posts is a front seat structure indicated generally by 101. The form of this structure as particularly shown in Fig. 2 comprises a one piece front heel board 102, bottom pan 103, a seat pan 104, a rear riser 105, a cushion retainer 106, and a front seat back panel 107. The heel board 102 at its bottom side edges is provided with an inwardly turned flange 108 while its bottom front edge is provided with a forwardly extending flange 109. This structure is raised upon and secured to the cross members 110 and 111 which extend from side to side of the body underframe with its side inturned flanges 108 resting upon the flanges 58 of the sills 52. The sides of the seat back panel are secured to the B and C posts as indicated at points 112. The side sills 52 are further interbraced at the bottoms of the B—C posts by an upwardly facing channel cross brace 117 which has its outer ends 117' offset upwardly as shown in Figure 17 to seat within the channels of the side sills and be secured thereto as by riveting.

The rear seat structure is also founded transversely upon the body underframe as is most clearly shown in Fig. 3 and is provided with a front heel board 113 having its ends secured directly upon the bottom branch of the angle of the tonneau side sills 80. A bottom seat pan 114 having forwardly and rearwardly extending flanges 115 and 116 respectively is also rested upon the inwardly extending flanges of the angle side sills.

Having thus far described the various structural elements and combinations thereof which constitute the major units of the body, there still remains to describe the particular manner of assembling the several units to form the completed body which is throughout extremely simple and strong and yet which permits that flexible adaptation to contour lines imposed by the demands of the customer.

The cowl unit which comprises the panel 10, the A posts 19, the bottom rail 40 of the wind shield opening, the peak panel 50, the toe board supports 34 and reinforcing bracket 30 therefor and the instrument board support 45 constitute the front unit. This unit includes no part of the side sills 52 nor of the top rails 67. The A posts carry the hinge support and joint reinforcing angle brackets 75 in position for securement to the top rails. The bottoms of the A posts are provided with the lip flanges or tabs 59 for welding or riveting to the sills. The lower edges of the cowl are provided with the inturned flanges 18 for securement to the under side of the sills 52 and the toe board support reinforcing bracket 30.

The next unit rearwardly of the cowl is the side unit, there being, of course, two such units—one right hand and one left hand. These side units each comprise a side sill 52 of the underframe, the B and C door post 60 and the top rail 67 all integrally joined together. The entire length of the side sill and that of the top rail between the posts A and E are included in this unit. The front end of the top rail 67 is joined through the medium of a butt joint with the upper end of a corresponding A post of the cowl unit. The rearwardly projecting portion 76 of the bracket 75 and the similar portion of the hinge member 73 serve to reinforce and strengthen this butt joint.

Figure 16:
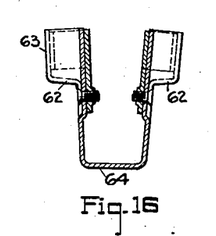

The front end of the sill 52 lacks the downwardly extending arm 54, compare Figs. 12 and 16, and is telescoped into the cowl unit directly beneath the bottom of the A post so that the latter in fact rests directly upon the sill. By the use of simple spot welding the tab 59 is welded to the web 53 of the sill, the flange 39 of the bracket is welded to the top 57 of the sill, the rearward extension 36 of the toe board support 34 is welded to the top of the side sill, the upwardly offset portion 32 of the reinforcing bracket 30 is welded to the inner arm 58 of the sill 52, and the flange 53 of the sill is welded to the bottom wall 18 of the channel formation at the rear end of the toe board bracket 30. The rear end of the sill is adapted to be secured directly to the inner side of the post D bracket 86 which latter forms part of the rear or tonneau unit as is best shown in Fig. 26. A portion 57 of the sill which extends rearwardly beneath the post D bracket is bent upwardly into substantially the plane of the portion 56 of the sill whereby to permit a ready securement of the rear portion of the sill to the post D bracket as by welding. It is understood, of course, that the usual cross connecting members between the side sills such as the members 110 and 111 are present in this construction. These members, however, are not applied until after the assembly of the cowl, side and tonneau units.

The last named unit is the rear or tonneau unit shown in Fig. 3. It comprises side sills 80, the rear sill 81, the D post 82 and the D post brackets 86 all of which constitute the frame for the tonneau paneling. Further this unit includes the E post at the rear of the side windows between the top of which and the D post extends the section 89 of the tonneau paneling. The tonneau panel is in this case made up of three sections integrally joined together to constitute in effect a single unitary panel extending from rear door post on one side to the rear door post on the other side of the body.

The extreme forward edge of the post D bracket is provided with a forwardly projecting tongue or tab 117 which is adapted to seat upon and be welded to the portion 53 of the sill 52, thus affording an additionally neat securing means in the vicinity of the post D bracket. The top rail 67 is intermediately joined to the top of the D post and at its rear end to the top of the E post by the employment of the gas welded joints. It is to be particularly noted that the continuation of the top rail from the section forward of the post D rearwardly thereof does not interfere with the general character of Z section such as is clearly shown in Fig. 14. There is thus provided no obstruction at the inner edge of the top rail along its entire length so that a roof unit of somewhat varying width can be readily accommodated between the upstanding arms or flanges 69 of the top rail without the necessity for that very accurate fitting which was heretofore always found necessary.

The units which next are placed in position are the front and rear seat structures respectively, the front seat structure being that shown in Fig. 2 and the rear seat structure being that, partly shown in Fig. 3. The joining faces of these structures are so simple that when positioned within the body they find their own place and fit snugly therein whereupon they are rigidly secured in place by welding.

Many variations in the design of the body constructed in accordance with the invention herein disclosed may be conceived and carried out. However, inasmuch as they would all be specific adaptations of the generic idea, it is desired to include any and all of these variations by broadly defining them in the accompanying claims.

What I claim as new and useful is:

1. In a pressed metal body construction a cowl assembly including a cowl panel having rear vertical edges on opposite sides thereof and provided at its rear transverse edge with a depending flange, a pair of door posts secured to the rear vertical edges of said cowl panel and a pair of stampings extending transversely between said doorposts, said stampings being nested through angular formations along their upper portions and provided with free flanges along their lower portions, one of said flanges being secured to said depending flange and the other of said flanges constituting a support for an instrument board support.

2. In a pressed metal body construction a cowl unit assembly including a cowl panel, and a door post secured to the rear vertical edge thereof, said door post being of substantially channel formation presenting inwardly of the body, the rear wall of said channel at the bottom thereof being bent laterally of the post and rearwardly of the body to form a securing tab spaced above the bottom line of the cowl unit for securing it to an adjacent unit.

3. In a pressed metal body construction a cowl unit assembly including a cowl panel, and a door post secured to the rear vertical edge thereof, said door post being of substantially channel formation presenting inwardly of the body, the rear wall of said channel formation door post at the bottom being bent laterally of the post and rearwardly of the body to form a securing tab spaced above the bottom line of the cowl unit and a bracket member secured to the forward wall of said channel door post at the bottom thereof, said bracket being provided with an inturned flange spaced above the bottom line of said cowl unit.

4. In a pressed metal automobile body construction, a cowl panel and door posts secured to the rear vertical edges of said cowl panel, a bottom rail extending between said door posts and secured to the rear transversely extending edge of the cowl panel and angle members affording exteriorly disposed connecting mediums between said bottom rail and said door posts.

5. In a pressed metal automobile body construction, a door post of channel cross section presenting inwardly and an angle member having its arms respectively secured to the base and forward wall of said door post, the arm which is secured to said forward wall being spaced therefrom to accommodate a portion of a cowl panel therebetween.

6. In a pressed metal automobile body construction, a door post of channel formation presenting inwardly of the body, a member secured to the exterior face of the forward wall of said channel door post, said member being provided at its inner edge with a shoulder, and a bottom rail panel extending transversely of the body and having its side edge seating flush in said shoulder.

7. In a pressed metal automobile body construction a door post of substantially channel formation presenting inwardly of the body, said door post being offset intermediate the ends thereof both in the bottom wall and forward side wall of the channel, and an angle member embracing said door post in the vicinity of said offset portion, the exterior surface of said post and member lying substantially in the same vertical planes.

8. In a pressed metal automobile body construction, a cowl panel having a bracket member mounted upon and secured thereto, said bracket member having a portion of upwardly presenting channel formation, one wall of said channel being provided with a laterally extending flange, a body side sill of substantially inverted channel formation nested within said upwardly presenting channel and being provided with a flange overlying said laterally extending flange for rigid securement thereto.

9. In a pressed metal automobile body construction, a cowl assembly including at its lower forward corners a toe-board supporting member, said member being provided with a rearwardly extending portion of upwardly presenting channel formation, and a body side sill of inverted channel formation overlying and secured to said upwardly presented channel member to constitute a box girder joint between the member and sill.

10. In a pressed metal automobile body construction, a cowl panel provided with inturned flanges at its lower edges and a bracket member of substantially triangular shape mounted upon said inturned flanges, said bracket member being provided with a rearwardly extending channel shaped portion constituting the forward extension of the body side sill.

In testimony whereof he hereunto affixes his signature.

JOSEPH LEDWINKA.